United States Patent
Zhang (10) Patent No.: US 9,645,844 B2
(45) Date of Patent: May 9, 2017

(54) SYSTEMS AND METHODS TO OPTIMIZE MULTI-VERSION SUPPORT IN INDEXES

(71) Applicant: FutureWei Technologies, Inc., Plano, TX (US)

(72) Inventor: Guogen Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 479 days.

(21) Appl. No.: 14/229,638

(22) Filed: Mar. 28, 2014

(65) Prior Publication Data
US 2015/0278270 A1    Oct. 1, 2015

(51) Int. Cl.
G06F 7/00    (2006.01)
G06F 9/46    (2006.01)
G06F 17/30    (2006.01)

(52) U.S. Cl.
CPC ........ *G06F 9/466* (2013.01); *G06F 17/30008* (2013.01); *G06F 17/30088* (2013.01); *G06F 17/30336* (2013.01); *G06F 17/30339* (2013.01); *G06F 17/30353* (2013.01)

(58) Field of Classification Search
CPC ............................................... G06F 17/30008
See application file for complete search history.

(56) References Cited

U.S. PATENT DOCUMENTS

| | | |
|---|---|---|
| 6,009,425 A | 12/1999 | Mohan |
| 2004/0249838 A1 | 12/2004 | Hinshaw et al. |
| 2005/0171960 A1 | 8/2005 | Lomet |
| 2007/0118547 A1 | 5/2007 | Gupta et al. |
| 2012/0084274 A1 | 4/2012 | Renkes et al. |
| 2012/0109903 A1 | 5/2012 | Freedman et al. |
| 2012/0166407 A1 | 6/2012 | Lee et al. |

(Continued)

FOREIGN PATENT DOCUMENTS

| | | |
|---|---|---|
| CN | 102103642 A | 6/2011 |
| CN | 102567453 A | 7/2012 |

(Continued)

OTHER PUBLICATIONS

International Search Report and Written Opinion of the International Searching Authority received in Patent Cooperation Treaty Application No. PCT/US2015/074299 mailed Jun. 29, 2015, 13 pages.

(Continued)

*Primary Examiner* — Ajith Jacob
(74) *Attorney, Agent, or Firm* — Slater Matsil, LLP (57) ABSTRACT

System and method embodiments are provided for multi-version support in indexes in a database. The embodiments enable substantially optimized multi-version support in index and avoid backfill of commit log sequence number (LSN) for a transaction identifier (TxID). In an embodiment, a method in a data processing system for managing a database includes determining with the data processing system whether a record is deleted according to a delete indicator in an index leaf page record corresponding to the record; and determining with the data processing system, when the record is not deleted, whether the record is visible according to a new record indicator in the index leaf page record and according to a comparison of a system commit TxID at the transaction start with a record commit TxID obtained from the index leaf page record.

16 Claims, 4 Drawing Sheets

(56) References Cited

U.S. PATENT DOCUMENTS

2012/0233139 A1 9/2012 Larson et al.
2013/0262423 A1 10/2013 Graefe et al.

FOREIGN PATENT DOCUMENTS

CN 102682071 A 9/2012
CN 102750376 A 10/2012

OTHER PUBLICATIONS

International Search Report and Written Opinion of the International Searching Authority received in Patent Cooperation Treaty Application No. PCT/CN2015/074928 mailed Jun. 15, 2015, 13 pages.
Becker, B., "An Asymptotically Optimal Multiversion B-Tree," The VLDB Journal 5, 1996, pp. 264-275.
Bober, P. et al., "Indexing for Multiversion Locking: Alternatives and Performance Evaluation," IEEE Transactioins on Knowledge and Data Engineering, vol. 9, No. 1, Jan.-Feb. 1997, pp. 68-84.
Comer, D., "The Ubiquitous B-Tree," ACM Computing Surveys, vol. 11, No. 2, Jun. 1979, pp. 121-137.
Graefe, G., "Modern B-Tree Techniques," Foundations and TrendsR in Databases, vol. 3, No. 4, 2010, pp. 203-402, DOI: 10.1561/1900000028.
Mohan, C., "ARIES/IM: An Efficient and High Concurrency Index Management Method Using Write-Ahead Logging," Special Interest Group on Management of Data, Special Interest Group on Management of Data, 1992, pp. 371-380.
Mohan, C. et al., "ARIES:A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.
Mohan, C., "Commit-LSN: a Novel and Simple Method for Reducing Locking and Latching in Transaction Processing Systems," Data Base Technology Institute, IBM Almaden Research Center, Proceedings of the 16th VLDB Conference, Aug. 1990, 13 pages.

SYSTEMS AND METHODS TO OPTIMIZE MULTI-VERSION SUPPORT IN INDEXES

CROSS-REFERENCE TO RELATED APPLICATIONS

The present application is related to U.S. patent application Ser. No. 14/229,519, filed Mar. 28, 2014 and entitled "Efficient Methods and Systems for Consistent Read in Record-Based Multi-Version Concurrency Control," which is incorporated herein by reference as if reproduced in its entirety.

TECHNICAL FIELD

The present invention relates to a system and method for database management, and, in particular embodiments, to a system and method for multi-version support in indexes.

BACKGROUND

Database management systems frequently use multi-version concurrency control (MVCC) to provide high concurrency and snapshot read consistency. MVCC index support is critical for performance and scalability. For example, efficient index support is critical to database performance and scalability. B+-tree (or B-tree) are commonly used in databases for indexes. Due to high concurrency requirements, operations on B-tree indexes are quite sophisticated.

There are a few approaches to support multi-version in indexes. Some are drastically different from the standard B-tree. Others treat the index pages the same way as the data pages and use UNDO to get history images—either page-based or row-based undo. Due to B-tree page split, page UNDO is not always straight-forward. Thus, although MVCC index support is critical, efficient index MVCC support has been challenging.

SUMMARY

In accordance with an embodiment, a method in a data processing system for managing a database includes determining with the database management system whether a record is deleted according to a delete indicator in an index leaf page record corresponding to the record; and determining with the database management system, when the record is not deleted, whether the record is visible according to a new record indicator in the index leaf page record and according to a comparison of a system commit transaction identifier (TxID) at the transaction start with a record commit TxID obtained from the index leaf page record.

In accordance with an embodiment, a data processing system configured for managing a database includes a processor and a computer readable storage medium storing programming for execution by the processor, the programming including instructions to: determine whether a record is deleted according to a delete indicator in an index leaf page record corresponding to the record; and determine, when the record is not deleted, whether the record is visible according to a new record indicator in the index leaf page record and according to a comparison of a system commit transaction identifier (TxID) at the transaction start with a record commit TxID obtained from the index leaf page record.

In accordance with an embodiment, a method in data processing system for multi-version concurrency control (MVCC) support in indexes in a database (DB) management system includes receiving a request for a first data record from a user, wherein the request comprises a transaction; retrieving a first index leaf page record corresponding to the first data record, wherein the first index leaf page record comprises a deletion flag, a new record flag, and a record identifier (RID); determining whether the first data record is deleted, not visible, or visible according to the deletion flag and the new record flag; and providing the first data record to the user when the first data record is visible, wherein the determining whether the first data record is deleted, not visible, or visible is performed without consulting a transaction table when a commit status of a transaction identifier (TxID) of the transaction is known.

In accordance with an embodiment, a data processing system configured for multi-version concurrency control (MVCC) support in indexes in a database (DB) management system includes a processor and a computer readable storage medium storing programming for execution by the processor, the programming including instructions to: receive a request for a first data record from a user, wherein the request comprises a transaction; retrieve a first index leaf page record corresponding to the first data record, wherein the first index leaf page record comprises a deletion flag, a new record flag, and a record identifier (RID); determine whether the first data record is deleted, not visible, or visible according to the deletion flag and the new record flag; and provide the first data record to the user when the first data record is visible, wherein the instructions to determine whether the first data record is deleted, not visible, or visible are executed without consulting a transaction table when a commit status of a transaction identifier (TxID) of the transaction is known.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are database (DB) management systems and methods to substantially optimize multi-version support in indexes for DB management. In an embodiment, one focus is on an extension to the standard B-tree to support multi-version using record-based approach without rollback for history versions of index records. B-tree indexes support three main operations: insert (key, record identifier (RID)), delete (key, RID), and search given a key range. For multi-version concurrency control (MVCC) support, these operations are extended to support version information (usually log sequence number (LSN)).

Figure 1:
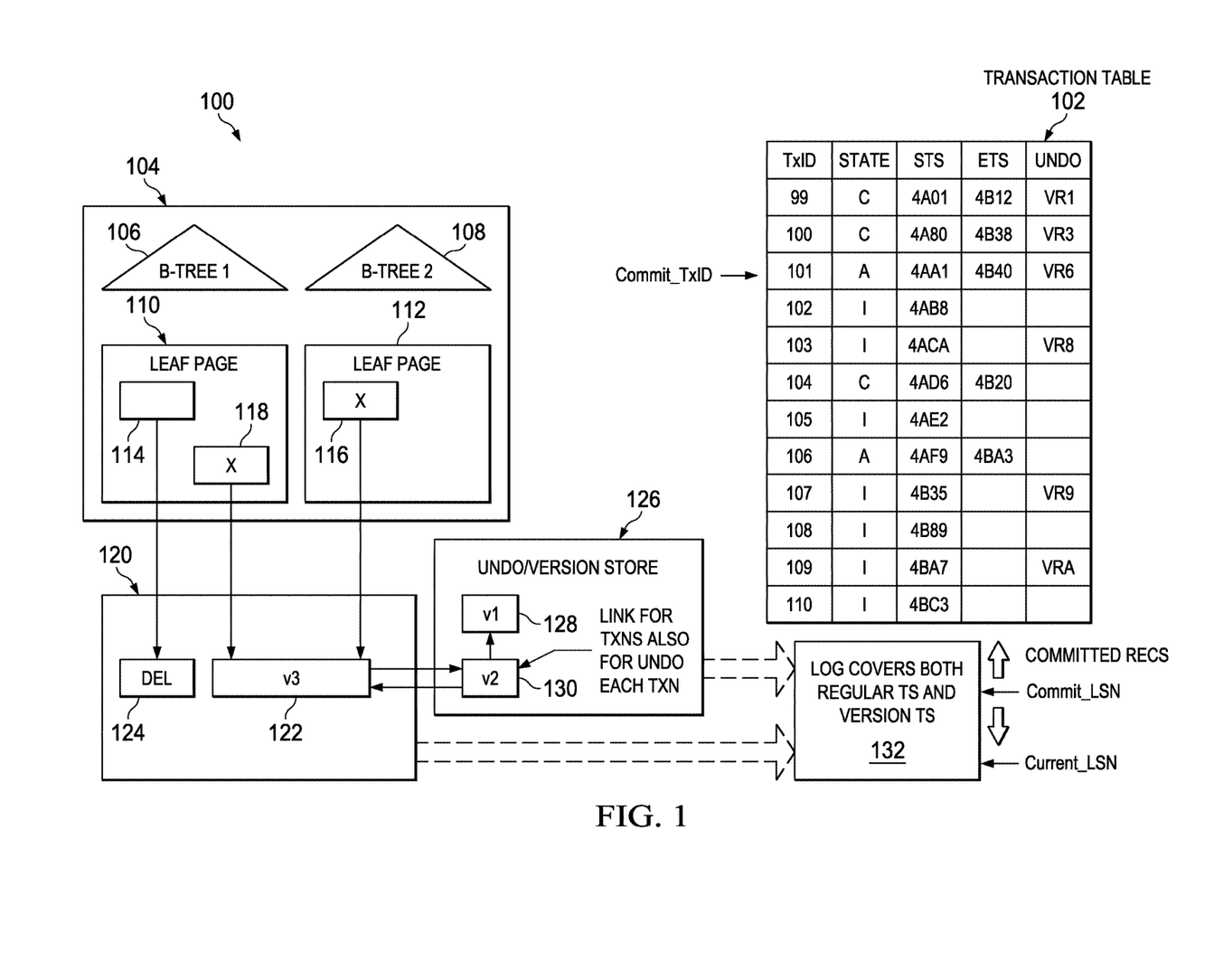
FIG. 1 is a block diagram illustrating an embodiment architecture for record-based MVCC.

FIG. 1 is a block diagram illustrating an embodiment architecture 100 for record-based MVCC. In an embodiment, the architecture 100 is similar to those in record-based MVCC, although the disclosed method for index MVCC is largely independent of data page MVCC. One focus of this disclosure is the leaf pages of the index B-tree.

The architecture 100 includes data pages 120, a transaction table 102, a log 132, an UNDO/version store 126, and B-tree index subsystem 104. The transaction table 102 includes entries for TxID, state, start timestamp (STS), end timestamp (ETS), and Undo for various records. The state can be committed (C), aborted (A), and inflight (I). The undo entry in the transaction table 102 indicates a version store record ID as the starting undo point of the undo record chain for the current transaction.

The log 132 includes both regular tablespace (TS) and version TS and includes committed records, (system) commit LSNs and a current LSN for a record. The UNDO/version store 126 includes links 128, 130 for the record versions and also for UNDO chain of each transaction (not shown). Thus, the link for version 2 (v2) points to the link for version 1 (v1) as the versions for the record.

The data page 120 includes a current version record 122 and a deleted record 124. In an embodiment, B-tree index subsystem 104 include B-tree 1 106 and B-tree 2 108. Each B-tree 106, 108 includes a corresponding leaf page 110, 112. Each leaf page 110, 112 includes a pointer 114, 116 to a current version record 3 122 in the data page 120 or to a deleted version record 124 in the data page 120.

In an embodiment, a record in B-tree leaf pages (or other index structures) will keep transaction information for its creation and deletion so that consistent read can be achieved without looking at data records. Old versions do not have to be moved into separate storage spaces. Older records can be purged (if deleted) or compacted to improve space and time efficiency. In an embodiment, these can be optimized by using Commit_TxID or Commit_LSN.

In an embodiment, multi-version support for B-tree indexes is achieved by extending the leaf page records with information about the transactions that create or delete the records. The system keeps track of all transaction status in a Transaction table, and logs the changes in a log. Log (record) sequence number (LSN) is used to identify the status of pages and records. When a transaction starts, the transaction is assigned a transaction ID and a start timestamp (i.e. LSN). All the changes made by the transaction can be temporarily marked with the transaction ID (or TxID). When the transaction commits, that transaction has a commit LSN. Consistent read is based on the commit LSN to achieve a snapshot consistency, i.e., a reader will only read records that were committed at the time when the reader starts. In other words, a record is visible to a reader if the record is not deleted and its transaction's commit LSN is smaller than the reader's LSN.

There are two approaches in comparing LSNs. One is to replace the TxID with LSN in records when the transaction commits or after it commits. The other is to look up TxID in the Transaction table to find the transaction status and its commit LSN for comparison. Both methods can be optimized by employing system-wide Commit_LSN or Commit_TxID. Commit_LSN is defined as the largest LSN such that all log records before this LSN have been committed. Likewise, Commit_TxID is the largest transaction ID such that all transactions before this TxID have been committed, and all records by rolled back (i.e. aborted) transactions before this TxID are physically undone. So, in an embodiment, the main techniques in supporting and optimizing index MVCC are:

1. Augment the leaf page records with transaction information. No need to have separate version storage for the index records.
2. Creation Transaction ID or Commit LSN can be removed from records and replaced with 1 bit to indicate the record is old and it's older than system-wide Commit_TxID or Commit_LSN (which is older than the oldest reader LSN.)
3. Deleted records can be purged if its deletion LSN or TxID is older than system-wide Commit_TxID or Commit_LSN.

Actions 2 and 3 are called compaction and can be performed before page split during search for spaces. After compaction, the version information becomes 1 bit, and since the majority of records will be compacted, this makes the index multi-version support lower in cost in terms of space requirement as compared to other methods. During a search operation, checking a record visibility can be substantially optimized by comparing Commit_TxID or Commit_LSN for a transaction ID or commit LSN in a record, and only consulting the Transaction table 102 for the newer records, which are usually a very small percentage of the overall records.

Figure 2:
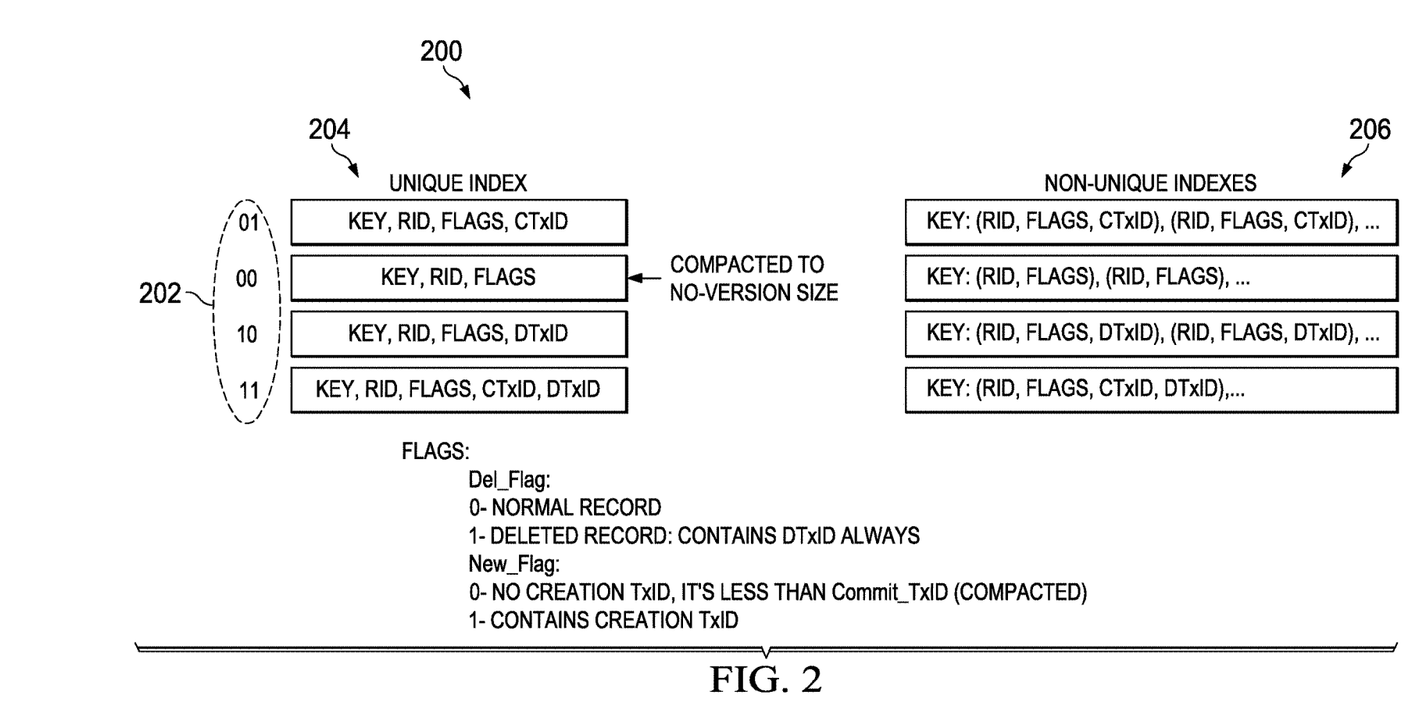
FIG. 2 is a diagram illustrating an embodiment system for maintaining records in index leaf pages.

FIG. 2 is a diagram illustrating an embodiment system 200 for maintaining records in index leaf pages. The records for unique indexes 204 and non-unique indexes 206 are different. For unique indexes 204, one key value can only have one data record, while for non-unique indexes 206, a key value can appear in multiple data records. The records are illustrated by using TxID (CTxID for Create TxID and DTxID for Delete TxID). The TxID could be Commit LSN (CLSN or CTS, Create Timestamp or DTS Delete Timestamp). The same field can be either TxID or LSN/TS as a transaction in flight does not have a commit LSN, yet so it uses TxID instead. TxID is used as an example for illustration, and the optimization is based on Commit_TxID. This approach avoids the backfill of Commit LSN into records to replace TxID.

The linkage between records is not explicitly shown as there could be, for example, a next pointer for each record or RID, or the linkage between the records could be organized as an array for the relationship.

In an embodiment, each version of an index record comprises a key to record identifier (RID) mapping, and wherein each uncompacted record comprises a TxID of a transaction that created or deleted the index record.

Flags 202 are associated with each record in the flags field. In an embodiment, the flags are a deletion flag (Del_Flag) and a new flag (New_Flag) which each can be either zero or one, where the deletion flag indicates whether the record is a normal record or a deleted record and where the new flag indicates whether the record is a new record or an old record. For example, a deletion flag of zero indicates a normal record and a deletion flag of one indicates a deleted record. In an embodiment, a deleted record always contains a DTxID. In an embodiment, a new flag equal to zero indicates no creation TxID (it is less than the Commit_TxID (compacted)) and is therefore not a new record whereas a new flag equal to one indicates that the record is a new record and that the record contains a creation TxID. In an embodiment, each flag 202 is a one bit flag—e.g., a one bit delete flag and a one bit new flag (or one bit new record flag). Use of the flags eliminates the need to search the record for certain TxIDs in certain cases, thereby improving speed and performance of the database, as is shown below with reference to FIG. 3.

Data and Index Update Operations

Insert:

When a record is inserted, it's inserted into a data page. And then the normal B-tree traversal occurs to search for the right leaf page to insert its key (key, TxID, RID). The only difference for a multi-versioned B-tree index from a standard B-tree is that the leaf page record contains CTxID, and before page split, compaction applies to see if there is enough space in the page. Compaction is to remove deleted records whose DTxID is smaller than the system Commit_TxID (or oldest_reader_LSN if it's maintained separately from updating transactions), and also remove the CTxID field and clear the new flag bit to indicate it is committed and visible to all active transactions.

If after compaction, there is enough space available to avoid a page split, just insert it normally. Otherwise, follow the same page split process to finish insertion.

Delete:

When a record is deleted, the normal B-tree traversal occurs to search for the corresponding record in the leaf page. The record could contain CTxID or could have been compacted to no CTxID. If it contains CTxID, check to see if it can be compacted so this field can be used for DTxID by setting the required bits: Del_flag=1 and New_flag=0. If it cannot or it does not contain CTxID, a new field DTxID needs to be added. (This may cause page compaction or page split if there is not enough space, could be avoided due to reserved space on page.)

Update:

When a data record is updated, there are two cases: (1) the key field is not changed. No change to an index is needed in this case; (2) the key field is changed. This turns into delete followed by insert for the index.

Figure 3:
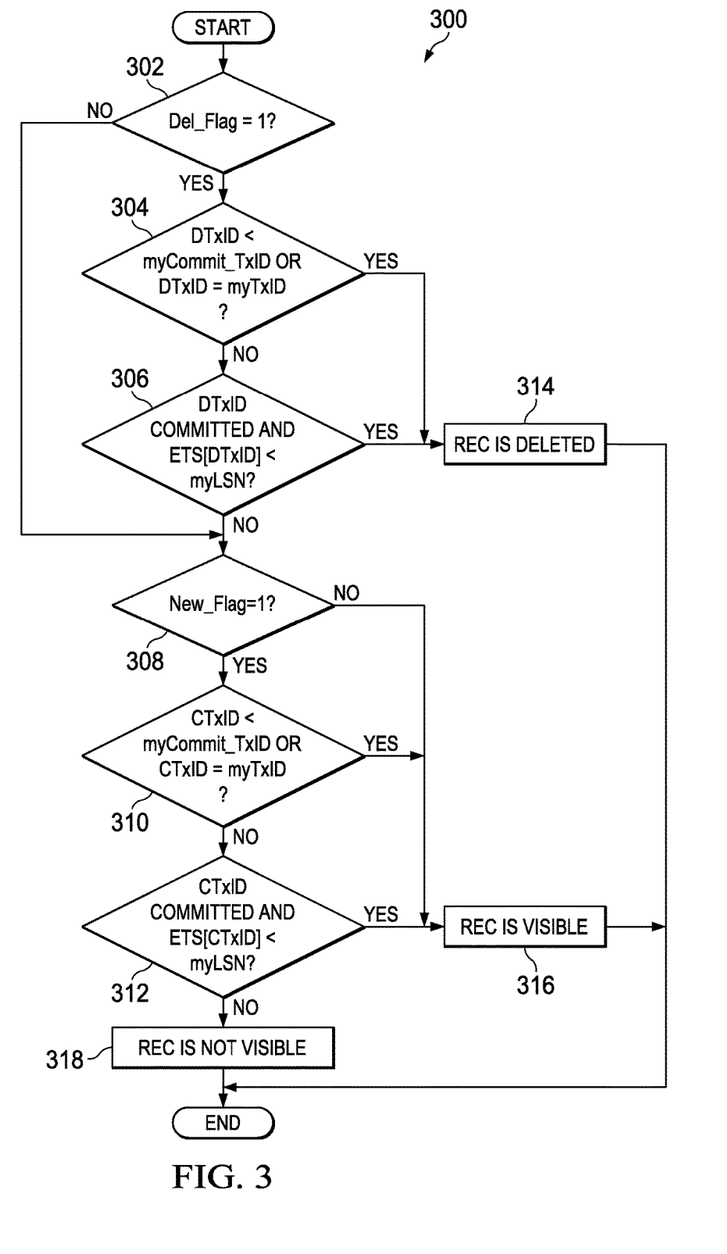
FIG. 3 is a flowchart illustrating an exemplary method for snapshot consistency read.

FIG. 3 is a flowchart illustrating an exemplary method 300 for snapshot consistency read. The method 300 begins at block 302, where it is determined whether the deletion flag is equal to one. If the deletion flag is equal to one, then the method 300 proceeds to block 304 where it is determined whether the delete TxID is less than or equal to the system commit TxID (myCommit_TxID) at the transaction start, or the current transaction is itself the transaction that made the deletion. If, at block 304, the delete TxID is less than or equal to the commit TxID, then the method 300 proceeds to block 314 where it is determined that the record is deleted, after which, the method 300 ends. If, at block 304, the delete TxID is not less than or equal to the commit TxID, then the method 300 proceeds to block 306 where the Transaction Table is checked to see whether the delete TxID is committed and the ETS of the delete TxID is less than a current log sequence number (LSN) (i.e., myLSN) at the transaction start. If, at block 306, the delete TxID is committed and the ETS of the delete TxID is less than a myLSN, then the method 300 proceeds to block 314 where it is determined that the record is deleted, after which, the method 300 ends.

If, at block 302, the deletion flag is not equal to one or at block 306, the delete TxID is not committed or the ETS of the delete TxID is not less than a current log sequence number (i.e. myLSN) at the transaction start, then the method 300 proceeds to block 308 where it is determined whether the new flag is equal to one. If, at block 308, the new flag is not equal to one, then the method 300 proceeds to block 316 where it is determined that the record is visible, after which, the method 300 ends. If, at block 308, the new flag is equal to one, then the method 300 proceeds to block 310 where it is determined whether the create TxID (CTxID) is less than or equal to a current commit TxID (myCommit_TxID) at the transaction start. If, at block 310, the create TxID (CTxID) is less than or equal to the myCommit_TxID or the current transaction is itself the transaction that made the insertion, then the method 300 proceeds to block 316 where it is determined that the record is visible, after which, the method 300 ends. If, at block 310, the create TxID (CTxID) is not less than or equal to the myCommit_TxID, then the method 300 proceeds to block 312 where the Transaction Table is check to see whether the create transaction TxID (CTxID) is committed and the ETS(CTxID) is less than a current log sequence number (LSN) (i.e., myLSN) at the transaction start. If, at block 312, the create transaction TxID (CTxID) is committed and the ETS (CTxID) is less than a current log sequence number (LSN) (i.e., myLSN) at the transaction start, then the method 300 proceeds to block 316 where it is determined that the record is visible, after which, the method 300 ends. If, at block 312, it is determined that the create transaction TxID (CTxID) is not committed, or the ETS(CTxID) is not less than a current log sequence number (LSN) (i.e., myLSN) at the transaction start, then the method 300 proceeds to block 318 where it is determined that the record is not visible, after which, the method 300 ends.

Thus, for snapshot consistency read, at the beginning of the reader: keep a copy of the current Commit_TxID and Current LSN, together with the TxID for the reader, we call these myCommit_TxID, MyLSN, and myTxID. This could be the same as the snapshot consistency read for the data pages. One difference for index leaf page read is the visibility check for each RID record, as described in the preceding flowchart. This logic applies to each record or RID record (in a non-unique index). Once a RID or a RID list is returned from index search, if the corresponding data record or records are to be fetched, the data page record read process should be followed to find the right records as the index key may point to the latest record version only while the valid record is in the history version chain.

Figure 4:
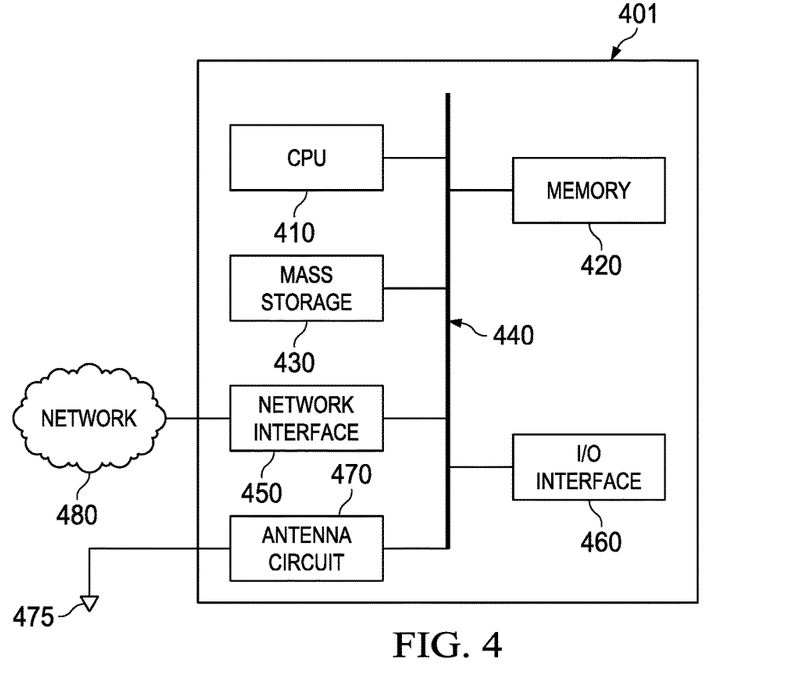
FIG. 4 illustrates a computing platform that may be used for implementing, for example, the devices and methods described herein, in accordance with an embodiment.

FIG. 4 is a block diagram of a processing system 400 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, memory 420, a mass storage device 430, a network interface 450, an I/O interface 460, and an antenna circuit 470 connected to a bus 440. The processing unit 401 also includes an antenna element 475 connected to the antenna circuit.

The bus 440 may be one or more of any type of several bus architectures including a memory bus or memory controller, a peripheral bus, video bus, or the like. The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs.

The mass storage device 430 may comprise any type of storage device configured to store data, programs, and other information and to make the data, programs, and other information accessible via the bus 440. The mass storage device 430 may comprise, for example, one or more of a solid state drive, hard disk drive, a magnetic disk drive, an optical disk drive, or the like.

The I/O interface 460 may provide interfaces to couple external input and output devices to the processing unit 401. The I/O interface 460 may include a video adapter. Examples of input and output devices may include a display coupled to the video adapter and a mouse/keyboard/printer coupled to the I/O interface. Other devices may be coupled to the processing unit 401 and additional or fewer interface cards may be utilized. For example, a serial interface such as Universal Serial Bus (USB) (not shown) may be used to provide an interface for a printer.

The antenna circuit 470 and antenna element 475 may allow the processing unit 401 to communicate with remote units via a network. In an embodiment, the antenna circuit 470 and antenna element 475 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 470 and antenna element 475 may also provide Bluetooth and/or WiFi connection to other devices.

The processing unit 401 may also include one or more network interfaces 450, which may comprise wired links, such as an Ethernet cable or the like, and/or wireless links to access nodes or different networks. The network interface 401 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a data processing system for database management, the method comprising:
   determining with the data processing system whether a record is deleted according to a delete indicator in an index leaf page record corresponding to the record; and
   determining with the data processing system, when the record is not deleted, whether the record is visible according to a new record indicator in the index leaf page record and according to a comparison of a system commit transaction identifier (TxID) at a transaction start with a record create TxID obtained from the index leaf page record.

2. The method of claim 1, wherein determining whether the record is deleted comprises comparing a delete TxID to the system commit TxID at the transaction start, wherein the record is deleted when the delete indicator indicates the record is deleted and when the delete TxID is less than or equal to the system commit TxID at the transaction start.

3. The method of claim 2, wherein determining whether the record is deleted further comprises determining that the record is deleted when the delete TxID is committed and an end timestamp (ETS) of the delete TxID is less than a current log sequence number (LSN) at the transaction start.

4. The method of claim 1, wherein the record is visible when the record is not deleted and when the record create TxID is less than or equal to the system commit TxID at the transaction start.

5. The method of claim 1, wherein the record is visible when the record is not deleted and when an ETS of the record create TxID is less than a current log sequence number (LSN) at the transaction start.

6. The method of claim 1, wherein the record is not visible when the record is not deleted, when the record create TxID is greater than the system commit TxID at the transaction start, and when an ETS of the record create TxID is not less than a current log sequence number (LSN) at the transaction start.

7. The method of claim 1, wherein the delete indicator comprises a one bit delete flag.

8. The method of claim 1, wherein the new record indicator comprises a one bit new record flag.

9. A data processing system configured for managing a database, the data processing system comprising:
   a processor; and
   a computer readable storage medium storing programming for execution by the processor, the programming including instructions to:
      determine whether a record is deleted according to a delete indicator in an index leaf page record corresponding to the record; and
      determine, when the record is not deleted, whether the record is visible according to a new record indicator in the index leaf page record and according to a comparison of a system commit transaction identifier (TxID) at a transaction start with a record create TxID obtained from the index leaf page record.

10. The data processing system of claim 9, wherein the instructions to determine whether the record is deleted comprise instructions to compare a delete TxID to the system commit TxID at the transaction start, wherein the record is deleted when the delete indicator indicates the record is deleted and when an end timestamp (ETS) of the delete TxID is less than or equal to the system commit TxID at the transaction start.

11. The data processing system of claim 10, wherein the instructions to determine whether the record is deleted further comprise instructions to determine that the record is deleted when the delete TxID is committed and the ETS of the delete TxID is less than a current log sequence number (LSN) at the transaction start.

12. The data processing system of claim 9, wherein the record is visible when the record is not deleted and when the record create TxID is less than or equal to the system commit TxID at the transaction start.

13. The data processing system of claim 9, wherein the record is visible when the record is not deleted and when an ETS of the record create TxID is less than a current log sequence number (LSN) at the transaction start.

14. The data processing system of claim 9, wherein the record is not visible when the record is not deleted, when a current create TxID is greater than the commit TxID at the transaction start, and when an ETS of the record create TxID is not less than a current log sequence number (LSN) at the transaction start.

15. The data processing system of claim 9, wherein the delete indicator comprises a one bit delete flag.

16. The data processing system of claim 9, wherein the new record indicator comprises a one bit new record flag.

* * * * *